United States Patent [19]
Zelli

[11] 4,453,438
[45] Jun. 12, 1984

[54] ADJUSTABLE PLATFORM GUIDE FOR CIRCULAR SAWS

[76] Inventor: Joseph M. Zelli, 2215 Woodland Spring, Houston, Tex. 77077

[21] Appl. No.: 520,474

[22] Filed: Aug. 4, 1983

[51] Int. Cl.³ .............................................. B27B 9/04
[52] U.S. Cl. ........................................ 83/745; 30/372
[58] Field of Search ............... 83/745, 743, 486.1; 30/371, 372, 373, 374

[56] References Cited
U.S. PATENT DOCUMENTS

| | | | |
|---|---|---|---|
| 2,708,465 | 5/1955 | Huebner | 83/745 |
| 3,830,130 | 8/1974 | Moore | 83/745 |
| 4,059,038 | 11/1977 | Rietema | 83/745 |
| 4,077,292 | 3/1978 | Cole | 30/372 X |
| 4,095,632 | 6/1978 | Raulinaitis | 30/373 X |
| 4,307,513 | 12/1981 | Genge | 30/372 |

*Primary Examiner*—Jimmy C. Peters
*Attorney, Agent, or Firm*—Michael P. Breston

[57] ABSTRACT

The present invention provides a platform for guiding a circular portable power saw to make rapid, accurate, splinter-free cuts in wood, veneer, plywood, particle board, or other such soft material. The platform has a deck, a shoulder, and a rail and can be used with most portable circular power saws and involves using a portion of the deck and the coplanar shoulder, which is detachably secured to the deck, in order to support and guide the saw's baseplate. The upstanding rail is adjustably mounted on top of the deck and provides a guide surface for one edge of the baseplate.

9 Claims, 8 Drawing Figures

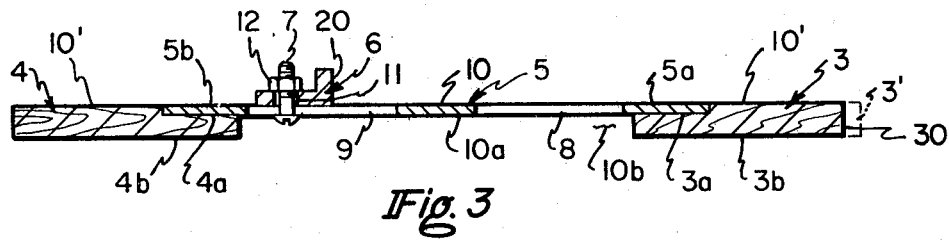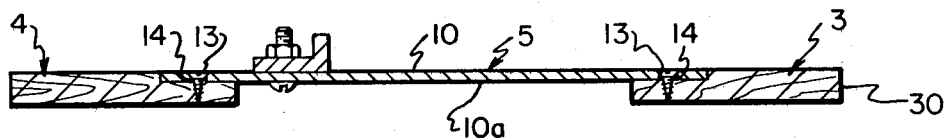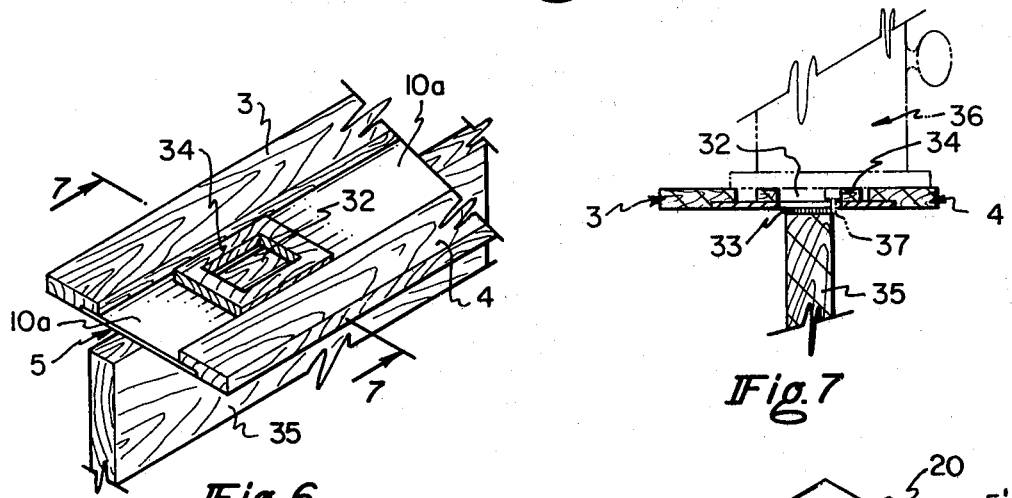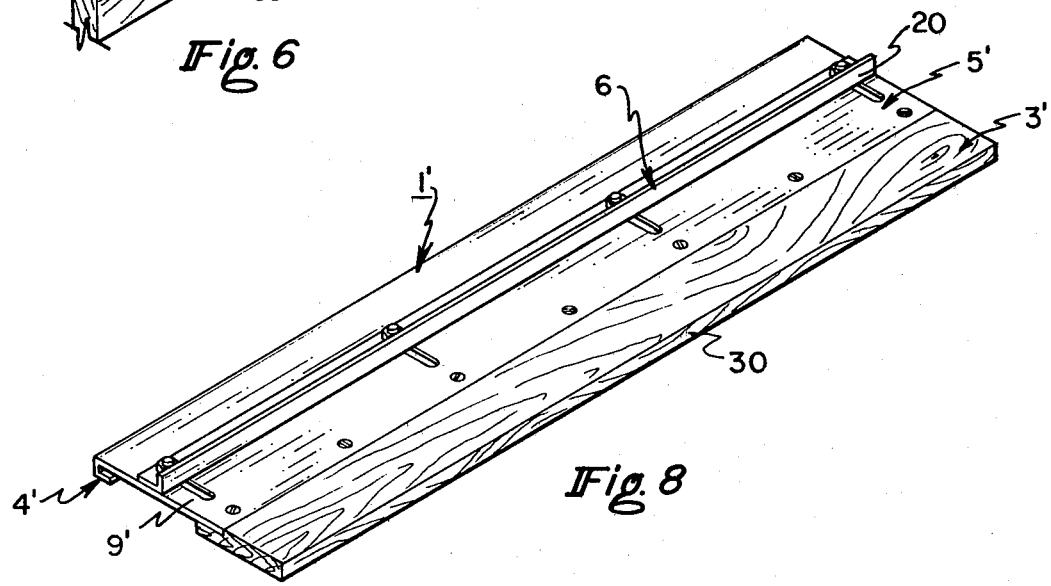

ADJUSTABLE PLATFORM GUIDE FOR CIRCULAR SAWS

BACKGROUND OF THE INVENTION

1. Field of the Invention

This invention relates to a platform for mechanically guiding a circular power saw along a predetermined line to be cut. This platform can be adjusted to accommodate almost any size power circular saw that has a flat baseplate, and it has particular utility to unskilled craftsmen wishing to employ a circular power saw for woodworking projects, as well as to professional carpenters in need of cutting and trimming doors and other workpieces made of particle board, veneer, plywood, etc.

2. Description of the Prior Art

Portable circular power saws are widely used by carpenters on the construction site. Because such saws are relatively compact and inexpensive, they are also now widely used by homeowners.

In using such saws, there is a need for a saw guide which allows cuts to be done from near or to zero, or cuts less than the bite of the blade, as precisely and quickly as full cuts. When a power saw is free hand guided, it is nearly impossible to cleanly cut a workpiece from or to zero, or for a depth which is less than the bite of the blade. Generally, such cuts require planing or sanding to obtain a properly finished cut, but through the use of the platform saw guide of this invention, smooth cuts may be directly obtained. There is a further need for the saw guide to be useable with saws having differently-sized baseplates.

Various attempts have been already made to provide an adjustable guide which is adapted to orient the blades of power saws having flat baseplates of various sizes. All of such saw guides include a base member made of a material which is cut by the saw's own blade on the first cut thereof to custom fit the saw guide to the saw's particular base plate.

But, in using the known saw guides, one finds major drawbacks: (1) inability to make accurate long cuts, (2) a tendency for the workpiece to chip and splinter along the line of cut, when working with plywood, veneer, and particle boards such as masonite, (3) the guides are relatively slow and cumbersome to use, (4) the guides require separate clamping means, (5) most of them are too wide for say cabinet work, (6) they are relatively fragile and are subject to warping.

Various saw guide devices have been already patented whose primary object is to allow for the making of accurate long cuts. Such devices are described, for example, in U.S. Pat. Nos. 3,186,452, 3,741,063, 3,830,130, 3,874,261, 3,983,776, 4,028,976, 4,050,340, 4,059,038, 4,077,292 and 4,095,632.

One saw guide proposed for reducing splintering is described in U.S. Pat. No. 4,075,920, Neal. The Neal patent discloses a guide plate having a guide surface for guiding the baseplate's edge farthest from the saw blade, and an edge made in a trimable material for guiding the saw blade itself. This edge is cut to size by the blade upon its first cut. In contrast to the present invention, further adjusting cuts of this edge are difficult or impossible because the severable material portion may not be wide enough and is secured to the rest of the guide by a tongue-and-groove joint.

In the Neal device when a power saw having a larger baseplate is to be employed or when the blade-guiding edge becomes used up, a new piece of trimable material has to be added and the old one replaced thereby.

Renewable blade-guiding edges are required not only for differently-sized baseplates but also when the teeth of the saw blade wear down. Blunting of the blade's teeth is common due to hidden nails frequently found under veneer of doors, and also due to unavoidable wear.

An attempt to overcome the drawbacks encountered in the use of Neal's saw guide is described in U.S. Pat. No. 4,307,513, Genge.

The Genge saw guide includes a trimable base member made of an easily cutable material, such as masonite, and a shield member made of aluminum or steel which has the same width as the base member. The shield member is placed on top of and overlies the base member and is adjustably secured thereto by bolts. A clamp track and clamps are provided near the outer edge of the shield.

In use, the Genge saw guide is placed over and is clamped down to the workpiece with the base member being positioned to overhang the workpiece to facilitate cutting of the base member. The first cut produces an original blade guide edge which is obtained by severing a portion of the base member in order to custom fit the base member to the saw's baseplate which is positioned on top of the upper surface of that portion of the base member which is not being overlain by the shield member.

The edge of the saw's baseplate farthest from the saw blade abuts against the shield's inner edge which serves as a guide surface for the baseplate. The base member can be moved forward and recut to provide an adjusted guide edge. The distance from the guide surface to the adjusted guide edge will again accommodate the saw's baseplate, so that the saw blade will again abut and be guided by the adjusted guide edge of the base member. The entire weight of the saw rests on and is distributed over the portion of Genge's base member which is not overlain by the shield member. Splintering can occur because the lower surface of the base member is not tightly pressed against, and therefore does not provide adequate downward support for, that portion of the workpiece that is retained after the cut is made.

There is a tendency for Genge's base member to separate from his shield member which may cause the guide surface on the shield member to lose contact with the edge of the saw's baseplate resulting in a non-linear cut. Also, because the base member carries the entire weight of the saw, it tends to want to rotate relative to the overlaying shield member, further exacerbating the separation problem between the base and shield members.

It is a main object of the present invention to provide a new and improved platform for guiding circular power saws which overcomes the above-mentioned and other known drawbacks and problems associated with known saw guides, and to provide a relatively simple-to-construct platform which allows long, linear, splinterless cuts to be made with ease even by amateur carpenters. The benefits and advantages of the invention will become more apparent as the description proceeds.

SUMMARY OF THE INVENTION

The present invention provides a platform for guiding a circular portable power saw to make rapid, accurate, splinter-free cuts in wood, veneer, plywood, particle board, or other such soft material. The platform of the invention has a deck, a shoulder, and a rail and can be used with most portable circular power saws and involves using a portion of the deck and the coplanar shoulder, which is detachably secured to the deck, in order to support and guide the saw's baseplate. The upstanding rail is adjustably mounted on top of the deck and provides a guide surface for one edge of the baseplate. An initial or first cut is made in the trimable shoulder to form a blade guide edge which abuts the saw blade and delineates the line of cut to be made by the blade.

The present invention allows for the frequent renewing of the blade guide edge by first moving the rail further away from the used up original blade guide edge, and then cutting a new blade guide edge in the shoulder.

In a preferred embodiment, there is a pair of such trimable shoulders, one on each side of the metallic deck. From under each deck-shoulder extend small nails which rapidly and conveniently grip each shoulder to the workpiece.

BRIEF DESCRIPTION OF THE DRAWINGS

FIG. 3 is a sectional view taken on line 3—3 of FIG. 1;

FIG. 4 is a sectional view taken on line 4—4 of FIG. 1;

FIG. 6 is a fractional upside down isometric view of the platform shown positioned over a side of a door;

FIG. 7 is a sectional view taken on line 7—7 of FIG. 6 showing a router cutting out a hinge mortise in the side of the door; and FIG. 8 is an isometric view of a simplified embodiment of the platform saw guide of the present invention having a single shoulder.

DETAILED DESCRIPTION OF PREFERRED EMBODIMENTS

Figure 1:
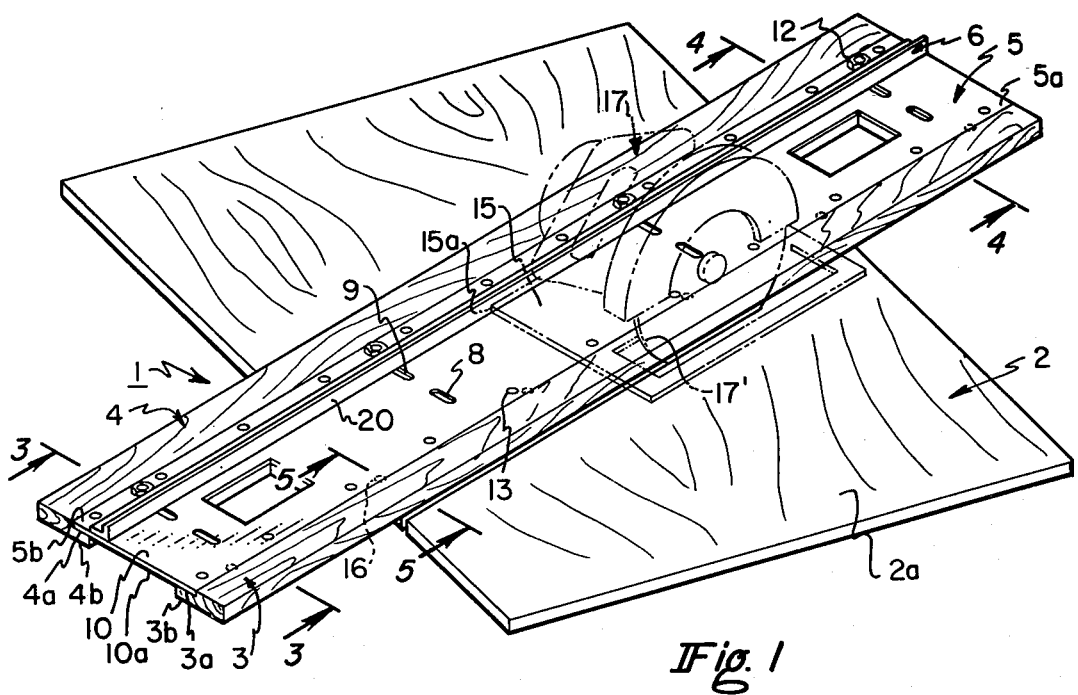
FIG. 1 is an isometric view of a preferred two-shoulder embodiment of the platform guide in accordance with the present invention shown in position on a workpiece and in the process of guiding a circular power saw over a workpiece.
Figure 5:
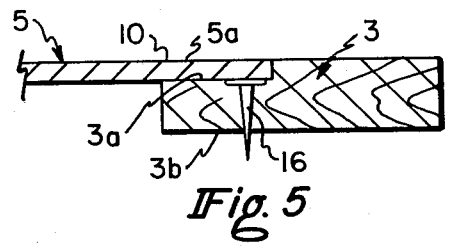
FIG. 5 is a fractional sectional view taken on line 5—5 of FIG. 1.

With reference to FIGS. 1-7, the saw guide platform 1 of this invention is adapted to trim a workpiece 2 and comprises, in a preferred embodiment, four parts: a right (as viewed in FIG. 2) trimable flat shoulder 3 and a left trimable flat shoulder 4 each made of a relatively soft material such as 5/16" plywood, a flat deck 5 which usually has the same length as that of shoulders 3 and 4 and is made of a relatively hard material such as 1/16" aluminum, and an upstanding guiderail 6 which can be L-shaped and also made of aluminum.

Rail 6 is placed on the top surface 10 of deck 5 and is adjustably secured thereto by bolts 7 (FIGS. 2-4) which extend through longitudinally-spaced trasverse slots 8 or 9 in deck 5 and through appropriate holes 11 in rail 6. A nut, wing nut, or other suitable fastener 12 screws onto the threads of each bolt 7. Tightening of the nuts 12 on the threads of the bolts 7 secures rail 6 to deck 5.

Figure 2:
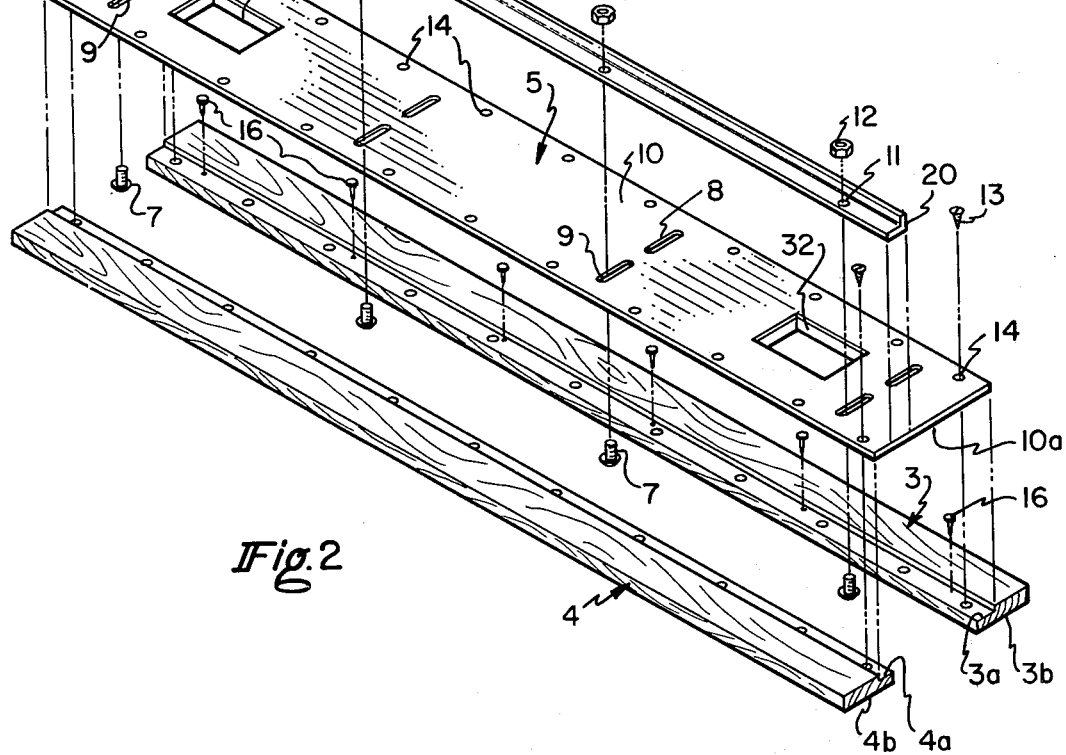
FIG. 2 is an exploded isometric view of the platform shown in FIG. 1.

In FIGS. 1 and 2 bolts 7 extend through slots 9 when the blade guide edge (as subsequently described) is obtained from shoulder 3, and bolts 7 extend through slots 8 when the blade guide edge is obtained from shoulder 4.

In FIG. 2 the L-shaped rail 6 is positioned for using slots 9, and it is rotated 180° for using slots 8. Thus, platform 1 is symmetrical relative to a longitudinal center plane.

The inner longitudinal edges 3a, 4a of shoulders 3, 4, respectively, are detachably secured to the opposite longitudinal edges 5a, 5b of deck 5 by screws 13 which fit in countersunk holes 14 in deck 5, so that the heads of the screws are flush with or slightly below the upper surface 10 of deck 5. Countersinking in this manner prevents screws 13 from marring the saw's baseplate 15.

The bottom face 10a of deck 5 is recessed from the bottom faces 3b, 4b of shoulders 3 and 4, respectively. The recessed space 10b below deck 5 accommodates the heads of bolts 7. In this manner, marring of the upper surface 2a of the workpiece 2 is avoided. Space 10b also allows compression loads from the saw 17 to be tranferred to shoulders 3, 4 where they are mostly needed.

Platform 1 is attached to the workpiece 2 by a plurality of very small nails 16 which bite into the workpiece 2 by making therein tiny holes that are practically invisible to the naked eye. These nails 16 are longitudinally-spaced apart and extend from under the joints formed by the adjoining edges 3a, 4a and 5a, 5b, respectively, between deck 5 and shoulders 3 and 4.

Use of platform 1 is simple and efficient. The platform 1 is placed on the top surface 2a of the workpiece 2 and becomes locked thereto against movement in a transverse direction by the tiny nails 16. One shoulder, say shoulder 3, is positioned to overhang the workpiece 2 to facilitate cutting shoulder 3. For that purpose, baseplate 15 is placed on top of the upper surface 10 of deck 5 and on the top surface 10' of shoulder 3. The edge 15a of baseplate 15 farthest from the saw blade 17' is contiguous with and engages the upstanding guide surface 20 of guiderail 6. Then the saw 17 is energized to sever a portion 3' (FIG. 3) of shoulder 3 which yields the desired blade guide edge 30 that custom fits platform 1 to the particular baseplate 15 of saw 17.

Whenever a new blade guide edge 30 is required, rail 6 is adjusted by repositioning it away from and parallel to the original edge 30 to fit the width of baseplate 15 and then again cutting off a portion 3' of shoulder 3. The distance from the guide surface 20 to the new guide edge 30 will accommodate baseplate 15 so that the blade 17' of saw 17 will again abut the new guide edge 30 of shoulder 3.

Each original or adjusted guide edge 30 is parallel to the rail's upstanding guide surface 20 and guides the saw blade 17' over a previously delineated line of cut to be made by the saw 17 on the workpiece 2.

Splintering along the cut being made is prevented because the lower surface 3b of shoulder 3 as well as edge 30 are both tightly pressed against the upper surface portion 2a of the workpiece 2 that will be retained after the cut. More particularly, the shoulder 3 and edge 30 press tightly against that portion of workpiece 2 immediately adjacent to the line being cut by the saw blade 17'. This downward support by shoulder 3 of the upper surface 2a of the workpiece 2 counteracts the saw blade's tendency to tear away splinters, as the teeth of blade 17' cut upwardly through the upper surface 2a of the workpiece 2.

With continued use, the original blade guide edge 30 gets frayed and needs renewing. Renewing may also be required due to the change of blade set caused by sharpening the teeth of the saw blade 17'. Saw blades are sometimes damaged after cutting nails hidden under the veneer of a workpiece. In all such cases, a new blade guide edge 30 must be cut. A busy carpenter may have to cut a new blade guide edge 30 once a week.

Readjustment and cutting of a new blade guide edge 30 is simple and rapid with the platform 1 of this invention: bolts 7 are loosened up and the guide rail 6 is pulled back with respect to the original blade guide edge 30, rail 6 is repositioned a short distance further away from the blade guide edge 30, and bolts 7 are retightened. This rail adjustment frees more of shoulder 3 for cutting to define a fresh new guide edge 30, following the procedure previously described for creating the first blade guide edge 30. Usually, one eighth of an inch of shoulder 3 is cut away during this procedure.

When shoulder 3 is fully used up, a new shoulder 3 can be easily installed by the removal of the screws 13 (FIG. 4). On the other hand, in the preferred embodiment, rail 6 is rotated 180° relative to its position on deck 5 shown in FIG. 1, and shoulder 4 becomes immediately available for use in exactly the same manner as shoulder 3 was before it got used up. Using two shoulders 3 and 4 on either side of deck 5 affords economy of space, convenience in use, and leads to greater stability for platform 1 on the top surface 2a of workpiece 2.

In effect, the platform 1 contains two saw guides: members 5, 3 and 6 form one saw guide and members 5, 4 and 6 form the other saw guide, both sharing common members 5 and 6. Rail 6 could be U-shaped and then it would not have to be rotated 180°.

Further advantages of the invention will now be apparent and can be summarized as follows: Platform 1 allows cuts to be made with speed and convenience; It requires no clumsy clamping means; It requires a minimum of overall width consistent with needed shoulder adjustability and, therefore, relatively narrow workpieces can be cut therewith; It has a pair of shoulders 3, 4 which are fixedly and detachably secured to the deck 5 and, therefore, there is no likelihood of separation therebetween; The shoulders 3, 4 receive maximum downward pressure to downwardly support the upper surface 2a of the workpiece 2, leading to a splinterless cut; The small nails 16 provide a positive and yet simple means to grip the workpiece, and these nails receive maximum pressure under the deck-shoulder joints. The metallic deck 5 prevents warping of shoulders 3 and 4 and provides a relatively rigid, smooth support-and-guide surface 10-10' for the saw's baseplate 15, and surface 10-10' is subjected to minimum warping. The metallic deck 5 is less prone to becoming scratched, leading to less friction and a faster cut.

In FIGS. 6-7 windows 32 are provided in deck 5 to allow the making of mortises on a door 35. The frames 34 around the windows 32 add additional upward support for deck 5. FIG. 7 shows a router 36 having a blade 37 in the process of cutting out a moritise 33 on door 35 for a hinge (not shown).

In FIG. 8 is shown a simplified but less desirable embodiment of a platform 1' also in accordance with this invention which in all material respects is similar to platform 1. Platform 1' utilizes a single shoulder 3'. Deck 5' has only slots 9' and a support leg 4'. The use of platform 1' is identical to that of platform 1 and need not be repeated.

Other variations will readily become apparent to those skilled in the art.

What is claimed is:
1. A saw guide platform for guiding a portable power saw, having a flat circular blade and a flat baseplate, across a workpiece to be cut during the sawing thereof, comprising:
   an elongated flat deck;
   a first flat shoulder extending from one side of said deck and being made of a material which is cutable by the saw blade, said first shoulder having an external edge which provides a first trimable blade guide edge adapted to indicate a predetermined line of cut and to guide the blade therealong, and the bottom surface of said first shoulder being adapted to contact the workpiece;
   an upstanding rail extending above the upper surface of the deck, the rail having a flat upstanding guide surface along one side thereof for engaging and guiding the farther edge of the saw's baseplate so that the saw's blade will be guided by the first shoulder's guide edge;
   fastening means for adjustably securing the rail to the top surface of the deck to thereby vary the distance between said guide surface and said blade guide edge; and
   the top surface of the deck and the top surface of the first shoulder together providing an adjustable support surface for the saw's baseplate.
2. The platform of claim 1, and
   a second flat shoulder extending from the other side of said deck and being made of a material which is cutable by the saw blade, said second shoulder having an external edge which provides a second trimable blade guide edge adapted to indicate a predetermined line of cut and to guide the blade therealong, and the bottom surface of said second shoulder being adapted to contact the workpiece, and the top surface of the deck and the top surface of the second shoulder together providing an adjustable support surface for the saw's baseplate.
3. A saw guide platform for guiding a portable power saw, having a flat circular blade and a flat baseplate, across a workpiece to be cut during the sawing thereof, comprising:
   an elongated flat deck having a bottom surface, a flat upper surface, a major dimension, and a minor dimension;
   a first flat shoulder and a second flat shoulder;
   each shoulder having an upper surface and a bottom surface, each shoulder surface having a major dimension and a minor dimension, the major dimension of each shoulder being substantially equal to the major dimension of the deck, and the minor dimension of each shoulder being less than the minor dimension of the deck, each shoulder having an internal edge along its major dimension, the material of each shoulder being cutable by the saw blade to provide an external trimable blade guide edge adapted to indicate the line of cut and to guide the blade therealong;
   first fastening means for detachably securing the internal edge of each shoulder to the deck on either side and along the major dimension thereof to thereby make the top surface of the deck and the top surfaces of the first and second shoulders substantially coplanar with the deck being between said shoulders;
   at least the bottom surface of each shoulder being adapted to contact the work piece;

an upstanding rail extending above the upper surface of the deck, the rail having a flat upstanding guide surface along one side thereof for engaging and guiding the farther edge of the saw's baseplate so that the saw's blade will be guided by the first or the second shoulder's guide edge;

fastening means for adjustably securing the rail to the top surface of the deck to thereby vary the distance between said guide surface and said blade guide edge; and the top surface of the deck and the top surface of the first or the second shoulder together providing an adjustable support surface for the saw's baseplate.

4. The saw guide platform of claim 3, wherein said deck is made of metal having a thickness which is substantially less than the thickness of each one of said shoulders;

said deck having slots which extend through the deck across the major dimension and holes in each edge of the deck along the major dimension;

said first fastening means extending through the holes in the deck into the inner edges of said shoulders;

the bottom surface of the deck is, in use, above the plane containing the bottom surfaces of the shoulders; and said second fastening means extending through said slots and through accommodating holes in said rail.

5. The platform guide of claim 3, and a plurality of small nails projecting outwardly from the bottom surface of each shoulder, said nails gripping the top surface of said workpiece to thereby maintain intimate contact therewith.

6. The platform of claim 3, wherein said deck is, in use, spaced from the upper surface of the workpiece to thereby increase the downward pressure on said shoulders.

7. The platform of claim 3, wherein the thickness of said deck is approximately 1/16" and the thickness of said shoulders is approximately 5/16".

8. The platform of claim 7, wherein said rail is L-shaped.

9. The platform of claim 7, wherein said rail is U-shaped.

* * * * *